(12) United States Patent
Duncan et al.

(10) Patent No.: US 8,115,994 B2
(45) Date of Patent: Feb. 14, 2012

(54) SCANNING WIDE FIELD TELESCOPE AND METHOD

(75) Inventors: Alan L. Duncan, Sunnyvale, CA (US);
Robert D. Sigler, Cupertino, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 805 days.

(21) Appl. No.: 12/165,483

(22) Filed: Jun. 30, 2008

(65) Prior Publication Data
US 2009/0015914 A1 Jan. 15, 2009

Related U.S. Application Data

(60) Provisional application No. 60/929,710, filed on Jul. 10, 2007.

(51) Int. Cl.
*G02B 23/00* (2006.01)
(52) U.S. Cl. ........................................................ 359/399
(58) Field of Classification Search ...................... None
See application file for complete search history.

(56) References Cited

U.S. PATENT DOCUMENTS

| | | | |
|---|---|---|---|
| 4,598,981 A | | 7/1986 | Hallam et al. |
| 4,925,301 A * | | 5/1990 | Rafanelli ...................... 356/124 |
| 5,107,369 A * | | 4/1992 | Hendrickson et al. ........ 359/399 |
| 5,198,653 A | | 3/1993 | Shen et al. |
| 5,528,502 A | | 6/1996 | Wertz |
| 5,898,529 A | | 4/1999 | Meyer et al. |
| 2003/0227696 A1 | | 12/2003 | Maker |
| 2004/0264846 A1 | | 12/2004 | Nakata et al. |
| 2006/0018012 A1* | | 1/2006 | Smith et al. ................... 359/366 |
| 2006/0061856 A1 | | 3/2006 | Voigt et al. |
| 2006/0140454 A1 | | 6/2006 | Northcott et al. |
| 2006/0209400 A1 | | 9/2006 | Wertz et al. |

* cited by examiner

*Primary Examiner* — Lee Fineman
(74) *Attorney, Agent, or Firm* — McDermott Will & Emery LLP

(57) ABSTRACT

A scanning wide-field telescope includes a primary reflecting mirror and a corrector assembly. The corrector assembly corrects light beams for spherical aberration imposed on the light beams by the primary reflecting mirror. The corrector assembly is located between the primary reflecting mirror and a viewing end of the telescope, and is configured to move to multiple optical focal points of the primary reflecting mirror.

16 Claims, 16 Drawing Sheets

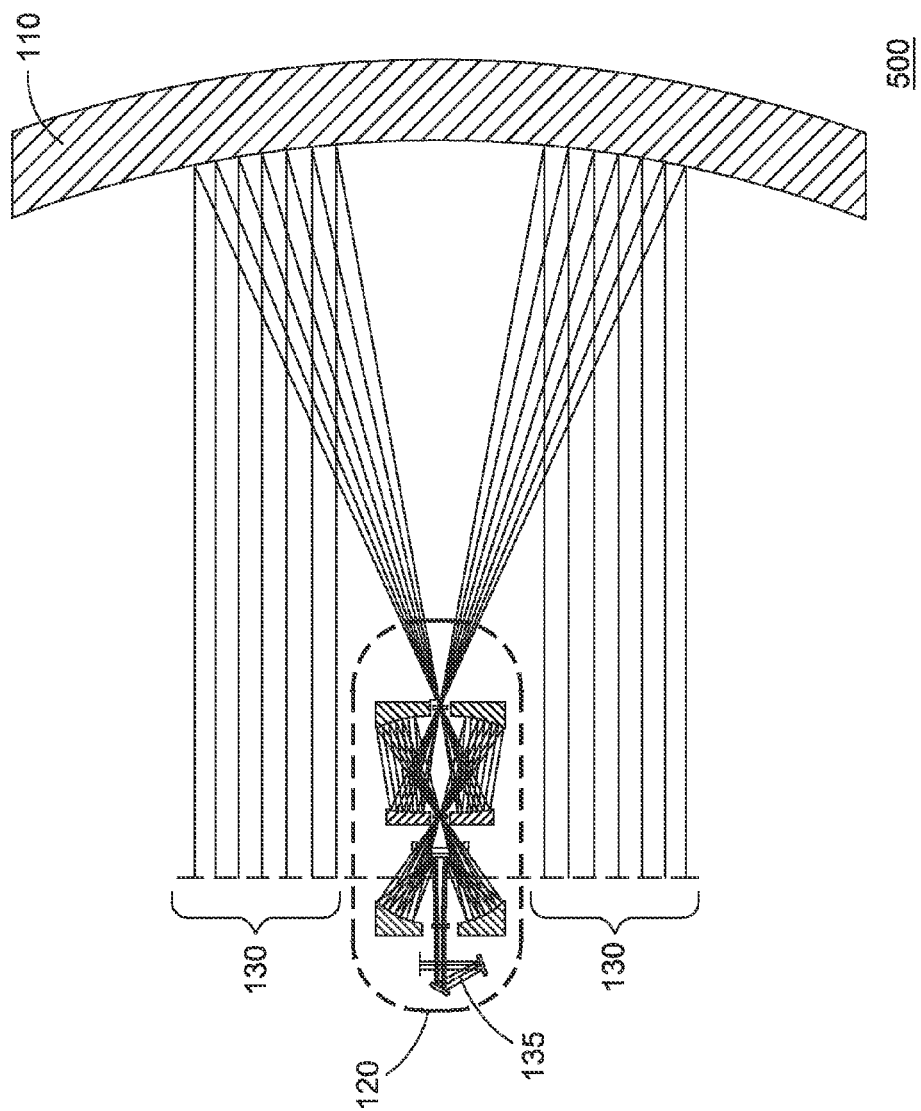

SCANNING WIDE FIELD TELESCOPE AND METHOD

CROSS-REFERENCES TO RELATED APPLICATIONS

The present application claims the benefit of priority under 35 U.S.C. §119 from U.S. Provisional Patent Application Ser. No. 60/929,710, entitled "Scanning Wide Field Telescope (SWIFT)," filed on Jul. 10, 2007, which is hereby incorporated by reference in its entirety for all purposes.

STATEMENT REGARDING FEDERALLY SPONSORED RESEARCH OR DEVELOPMENT

Not applicable.

FIELD

The present invention generally relates to telescopes and, in particular, relates to scanning wide field telescopes and methods for same.

BACKGROUND

Telescopes are integral to most, if not all, optical sciences departments and astronomical research facilities. Telescopes for space applications typically require a stable, agile spacecraft where the entire spacecraft is slewed to enable a change in view from a first object to a second object. These telescopes require complex gimbals, or large, flat siderostat mirrors in front of the spacecraft. Telescopes for ground applications typically require large, heavy, and complex gimbals.

SUMMARY

In accordance with one embodiment of the present invention, a scanning wide-field telescope is provided. The scanning wide-field telescope moves a corrector assembly to view objects that are peripheral to a center line of site of the scanning wide-field telescope. The corrector assembly is about a tenth the size and mass of a housing that includes a primary reflecting mirror. In certain exemplary embodiments of the present invention, the scanning wide-field telescope may be used without a stable, agile spacecraft, and/or without control moment gyroscopes, and/or reaction wheels, and/or without complex, massive gimbals. In certain exemplary embodiments, the scanning wide-field telescope is configured to rapidly scan over a large field of regard without slewing the telescope. Certain exemplary embodiments of the present invention may thus save mass, power, and expense.

In accordance with an embodiment, a scanning wide-field telescope includes a primary reflecting mirror and a corrector assembly. The corrector assembly is located between the primary reflecting mirror and a viewing end of the telescope, and moves within a first trajectory.

In accordance with an embodiment, a method for a scanning wide-field telescope is provided. The scanning wide-field telescope includes a primary reflecting mirror and a corrector assembly. The corrector assembly is located between the primary reflecting mirror and a viewing end of the telescope. The method includes: receiving light from an object to be viewed at the primary reflecting mirror; reflecting the light from the primary reflecting mirror; and moving the corrector assembly in a first trajectory to a focal point of the reflected light.

Additional features of the invention will be set forth in the description below, and in part will be apparent from the description, or may be learned by practice of the invention. The advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 5 illustrates an exemplary scanning wide field telescope in accordance with an embodiment of the invention including a primary reflective mirror and a corrector assembly;

DETAILED DESCRIPTION

In the following detailed description, numerous specific details are set forth to provide a full understanding of the present invention. It will be apparent, however, to one of ordinary skill in the art that the present invention may be practiced without some of these specific details. In other instances, well-known structures and techniques have not been shown in detail to avoid unwarranted obscurement of the present invention.

Figure 1:
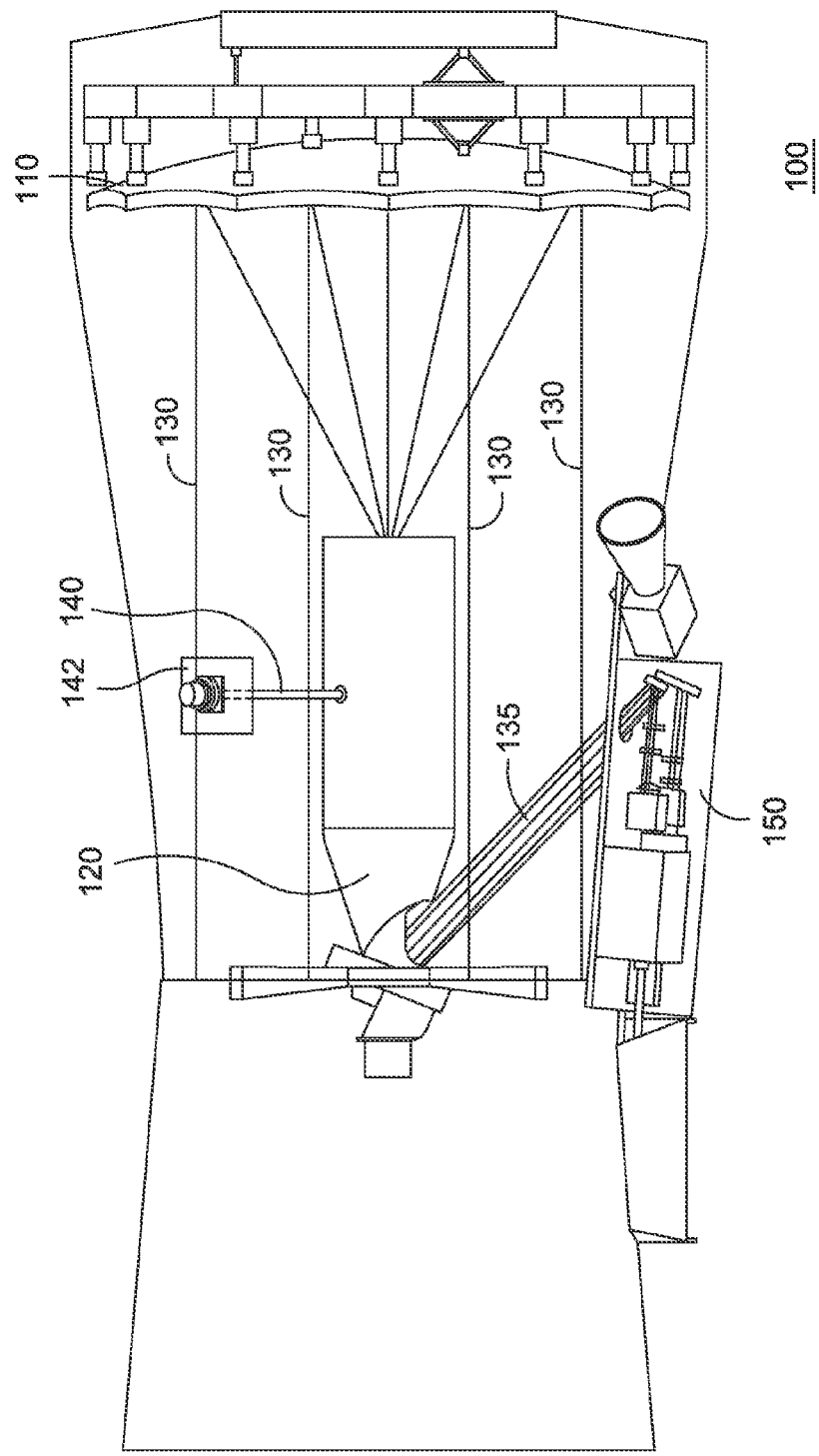
FIG. 1 is an illustration of an exemplary scanning wide field telescope in accordance with an embodiment of the invention.

FIG. 1 illustrates an exemplary embodiment of a scanning wide-field telescope 100. As shown in the figure, the scanning wide-field telescope 100 may comprise a primary reflecting mirror 110, a corrector assembly 120, an actuator arm 140, a frame support 142, and a sensor module 150. Light beams 130 are received from an object being viewed (the object is not shown in the illustration) and are reflected from primary reflecting mirror 110.

The light beams 130 enter the scanning wide-field telescope 100 from the left-hand side of FIG. 1 and proceed to primary reflecting mirror 110. Before interacting with the primary reflecting mirror 110, the beams of light 130 are distinct and separate. Once reflected from primary reflecting mirror 110, however, the beams of light 130 are focused to an optical plane located at an optical path entry point to corrector assembly 120. At the optical path entry point to corrector assembly 120 the beams of light 130 converge because they have been reflected by primary reflecting mirror 110.

Actuator arm 140 may be attached to a frame support 142 that is a part of the frame or otherwise supported by the body of the scanning wide-field telescope 100. Actuator arm 140 may be a monopod actuator and may be configured to operate with a second monopod actuator (not shown) where each of the first and second actuator arms 140 are configured to move the corrector assembly 120 in at least two planes. The movement of the corrector assembly is explained in greater detail in reference to FIGS. 2 and 3.

Corrector assembly 120 acts to correct spherical aberration that may be present in the light beams 130. Primary reflecting mirror 110 is spherically shaped, and this shape may induce spherical aberration in light beams 130 once the light beams are reflected from primary reflecting mirror 110. Those of skill in the art would understand that various lenses and optics may be used to correct for different aberrations.

Corrector assembly 120 may be modular and may contain different optics sets for various needs. For instance, corrector assembly 120 as a modular unit may include optics for processing infrared light, and a separate modular unit 120 may include optics for processing visible light, and the two modules may be swapped one for the other based on desire or need. In various exemplary embodiments described herein, the corrector assembly 120 comprises optics that are configured to process visible light, short-wave infrared (SWIR) light, medium-wave infrared (MWIR) light, and/or long-wave infrared (LWIR) light. Corrector assembly 120 is discussed in greater detail in reference to FIGS. 6, 7, 8 and 9.

Once the light beams 130 have been corrected for aberration (or otherwise processed) corrector assembly 120 transmits the processed light beams 135 to sensor module 150. Sensor module 150 may include optics for processing separate bandwidths of light, for instance, visible light, SWIR light, MWIF light, and/or LWIF light. Sensor module 150 is discussed in greater detail herein in reference to FIGS. 9 and 10.

Figure 2:
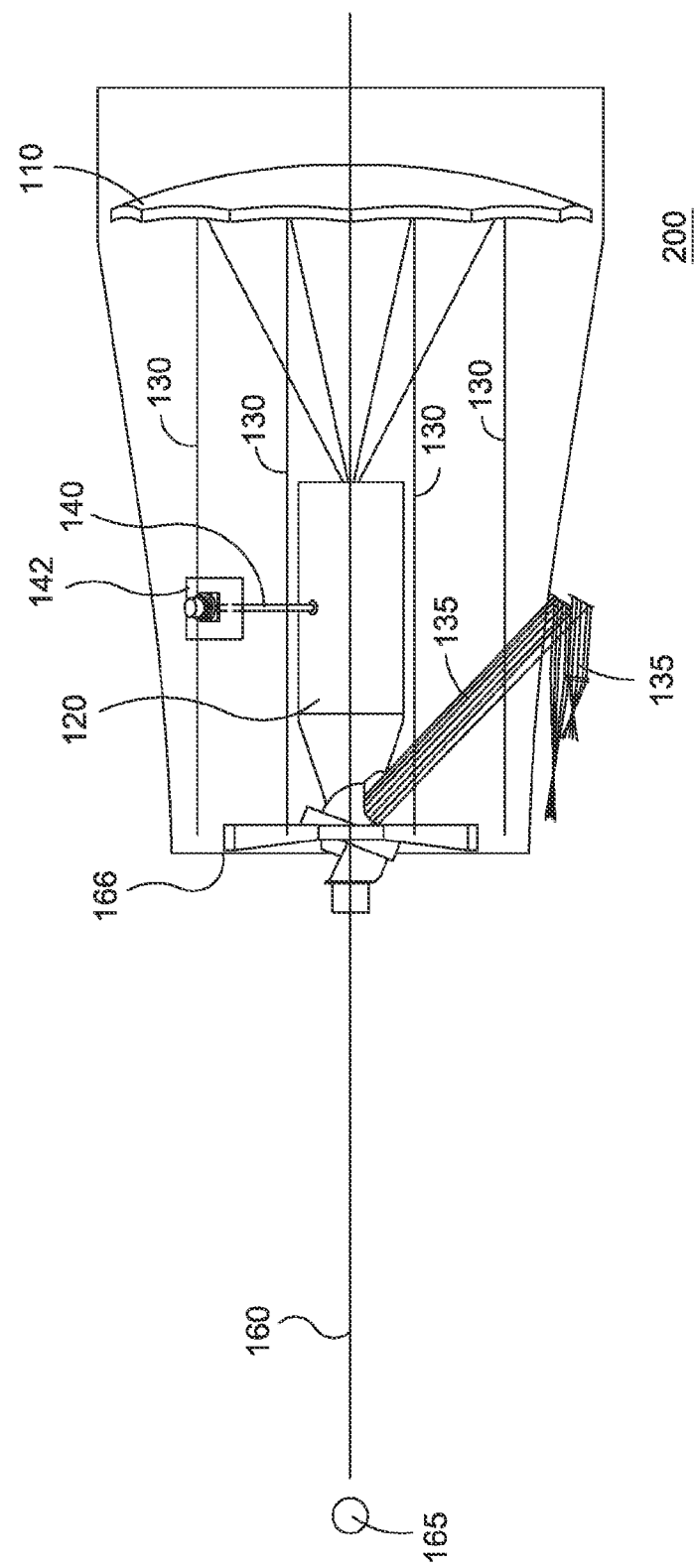
FIG. 2 illustrates an exemplary scanning wide field telescope in accordance with an embodiment of the invention.

FIG. 2 is an illustration of an exemplary embodiment of the present invention including scanning wide-field telescope 200. Similar elements are numbered identically in reference to FIG. 1, and generally throughout this document all of the figures with similar elements are identically numbered, for ease of understanding. Unnecessary, reiterative discussions of like components are not repeated for the sake of brevity. As shown in FIG. 2, corrector assembly 120 is aligned to axis 160. Axis 160 follows the scanning wide-field telescope's (element 200's) center line of sight to object of interest 165. Object of interest 165 may be a planet, a star, a gas cloud, areas of sea/land/air, borders, cities, events, weather occurrences, manufacturing and storage (illicit or otherwise), or other items of interest. The scanning wide-field telescope's center line of sight is substantially parallel to an axis produced by a lengthwise section of the scanning wide-field telescope 200. Described in different terms, axis 160 follows both the center of curvature of primary reflecting mirror 110 and the center point of a radius created by a circle tracking a cross-section of the hull 166, that is, the approximate center of scanning wide-field telescope 200. These features are further described in relation to FIG. 3.

Figure 3:
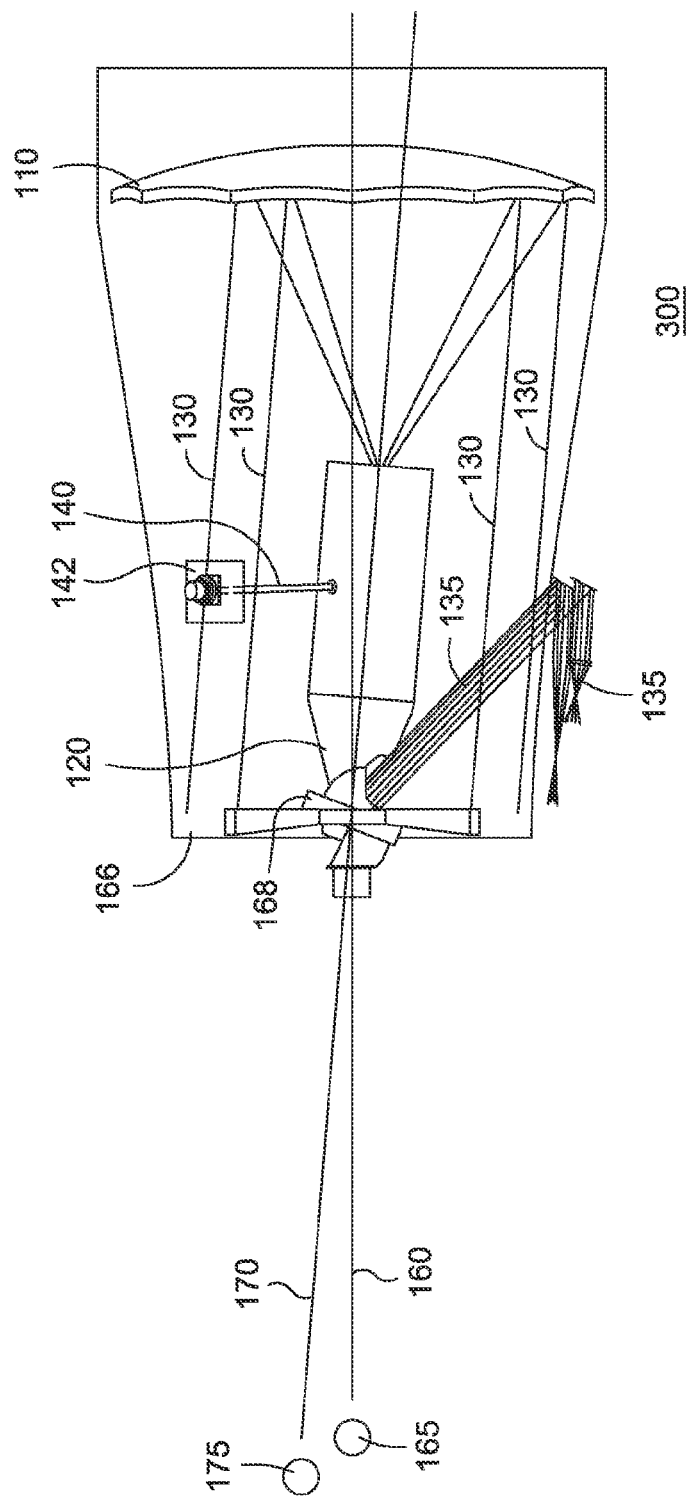
FIG. 3 illustrates an exemplary scanning wide field telescope in accordance with an embodiment of the invention.

FIG. 3 is an illustration of an exemplary embodiment of the present invention including scanning wide-field telescope 300. In comparison to FIG. 2, actuator arm 140 has either extended or retracted, thereby moving corrector assembly 120 from a center line of sight for scanning wide-field telescope 300 to a peripheral line of sight. The center line of sight is shown by axis 160. The peripheral line of sight is shown by axis 170. Axis 170 aligns with object of interest 175. Actuator arm 140 may be hydraulically, mechanically, or otherwise extendable and retractable, and in extending or retracting, actuator arm 140 moves corrector assembly 120. Actuator arm 140 is configured for pivotal connection between each of hull body 166 and corrector assembly 120. Either or both of the connections may be made with a u-joint, a gimble or gimble set, or a ball and socket, or other pivotal type connection. Corrector assembly 120 is pivotally fixed to the scanning wide-field telescope at connection point 168. Connection point 168 may be a gimble or a gimble set, or corrector assembly 120 may pivot or hinge from different connectivity, such as a ball and socket or similar connectivity.

With corrector assembly aligned to axis 170, light beams 130 reflect from a different reflection point on primary reflecting mirror 110. That is, light beams 130 are substantially parallel to axis 170 and axis 170 does not intersect primary reflecting mirror 110 at the center of primary reflecting mirror 110, and instead intersects at a point that allows light beams 130 (as these beams relate to object of interest 175) to be reflected at the entry point to corrector assembly 120.

Figure 4B:
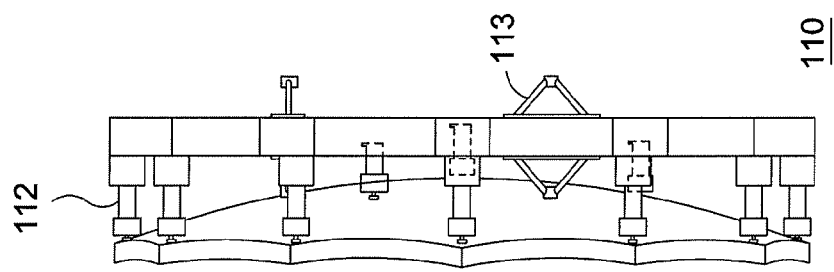
FIGS. 4A and 4B illustrate an exemplary scanning wide field telescope in accordance with an embodiment of the invention including a primary reflective mirror.
Figure 4A:
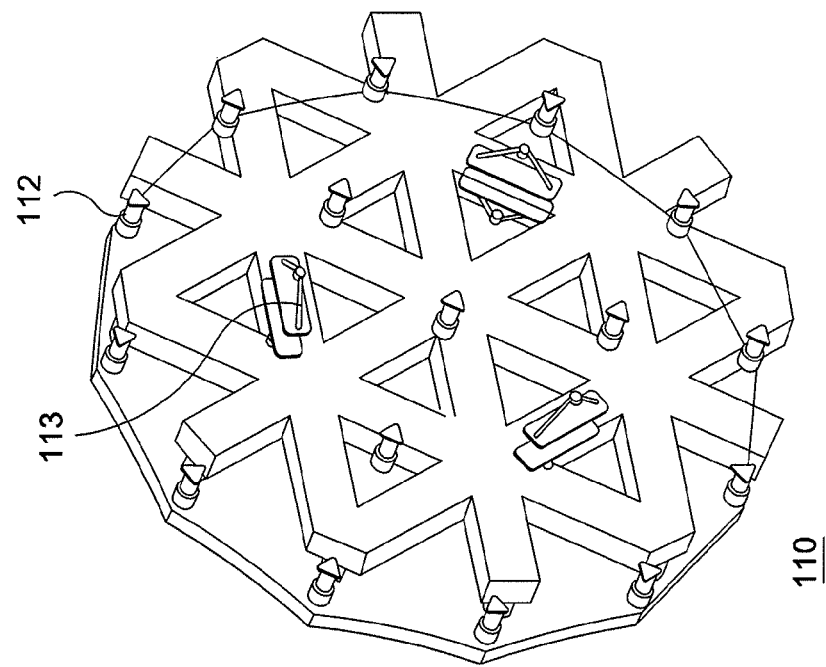

FIGS. 4A and 4B illustrate an aspect of an exemplary embodiment of the present invention including primary reflecting mirror 110. As shown in the figures, primary reflecting mirror 110 is spherically shaped. Primary reflecting mirror 110 is held in place with bipod elements 113. Bipod elements 113 need not be dual-legged attachment pieces, but may instead be single-legged, a tripod, or of other configurations. Bipod elements 113 may flex and move in relation to force applied to the primary reflecting mirror 110 by force actuators 112. Force actuators 112 are configured to move primary reflecting mirror 110 from a first concentric plane to additional concentric planes. Force actuators 112 may be pneumatic, mechanical, or otherwise actuated individually, in series, or in conjunction with one another to move primary reflecting mirror 110 to a needed or desired angle.

FIG. 5 illustrates an aspect of an exemplary embodiment of the present invention including a possible optical design 500 for the primary reflecting mirror 110 and corrector assembly 120. As shown in the figure, beams of light 130 proceed from the left-hand side of the illustration to the primary reflecting mirror 110. At primary reflecting mirror 110 the beams of light 130 are reflected to corrector assembly 120. At corrector assembly 120 the beams of light are processed, for instance, to correct for spherical aberration induced by the spherical face of primary reflecting mirror 110. Once the beams of light are processed, they are output as processed beams of light 135. The processed beams of light 135 may be provided to a sensor module, such as sensor module 150 shown in FIG. 1. The beams of processed light 135 may also be provided to a camera, such as a charged coupled device, to include a digital camera. As one of skill in the art would understand, the beams of processed light 135 may be provided to both of a sensor module and a camera (and/or other devices or processors) simultaneously using different reflective components and/or beam splitters.

Figure 6:
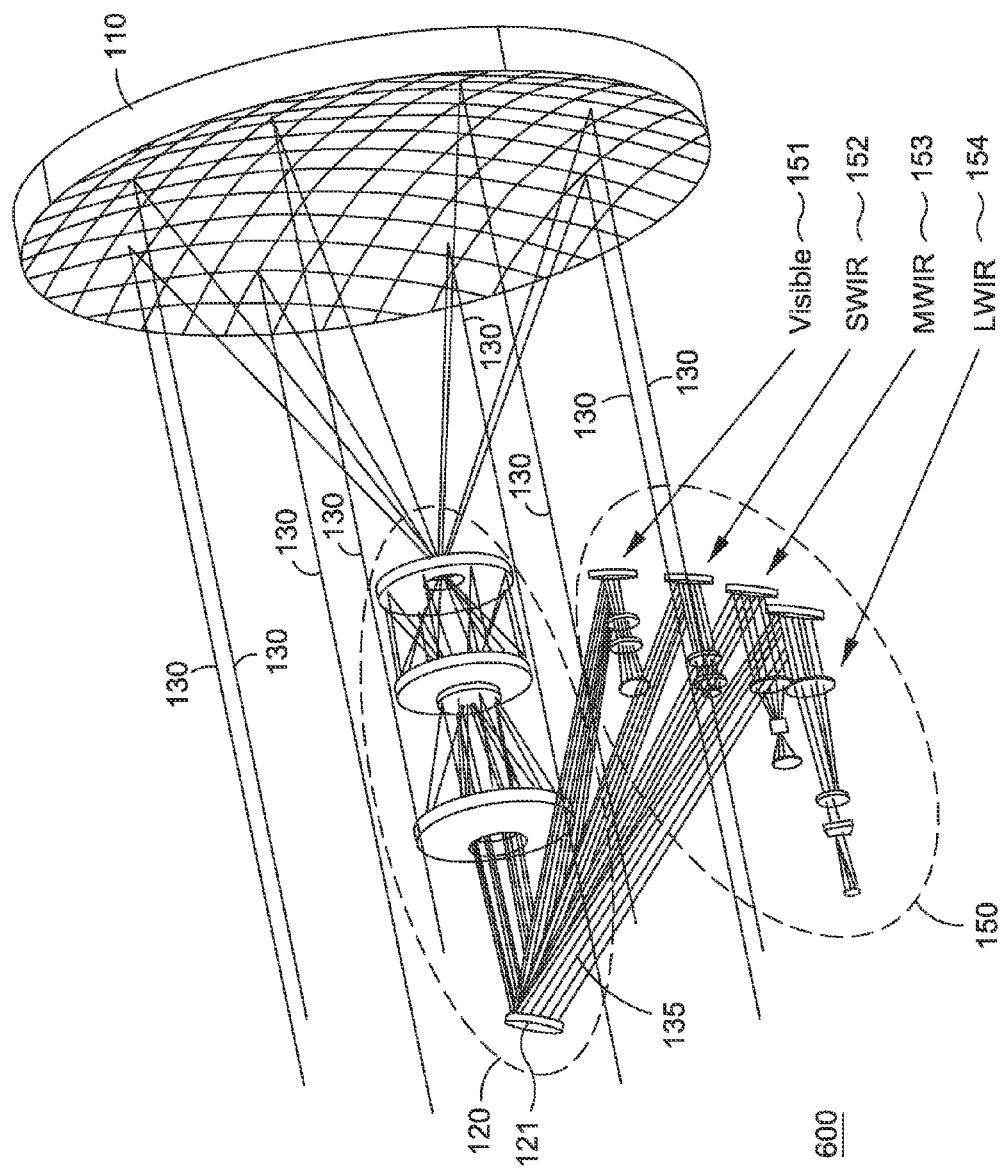
FIG. 6 illustrates an exemplary scanning wide field telescope in accordance with an embodiment of the invention including optical paths through a primary reflective mirror to a corrector assembly for visible light, short wave infrared (SWIR) light, mid-wavelength infrared (MWIR) light, and long-wavelength infrared (LWIR) light.

FIG. 6 illustrates an aspect of an exemplary embodiment of the present invention including a possible optical design 600 for primary reflecting mirror 110, corrector assembly 120, switching mirror 121, and optics processors 151, 152, 153, and 154 (respectively, for visible light, SWIR light, MWIR light, and LWIR light). As shown in the figure, after corrector assembly 120 has corrected or otherwise processed light beams 130, the light beams are output as processed light beams 135 to at least one of the optics processors 151, 152, 153, and 154 using switching mirror 121. While shown as a single mirror, multiple mirrors could be used in conjunction with beam splitters and/or reflective components to process multiple light bands simultaneously, as one of skill in the art would understand.

Figure 7:
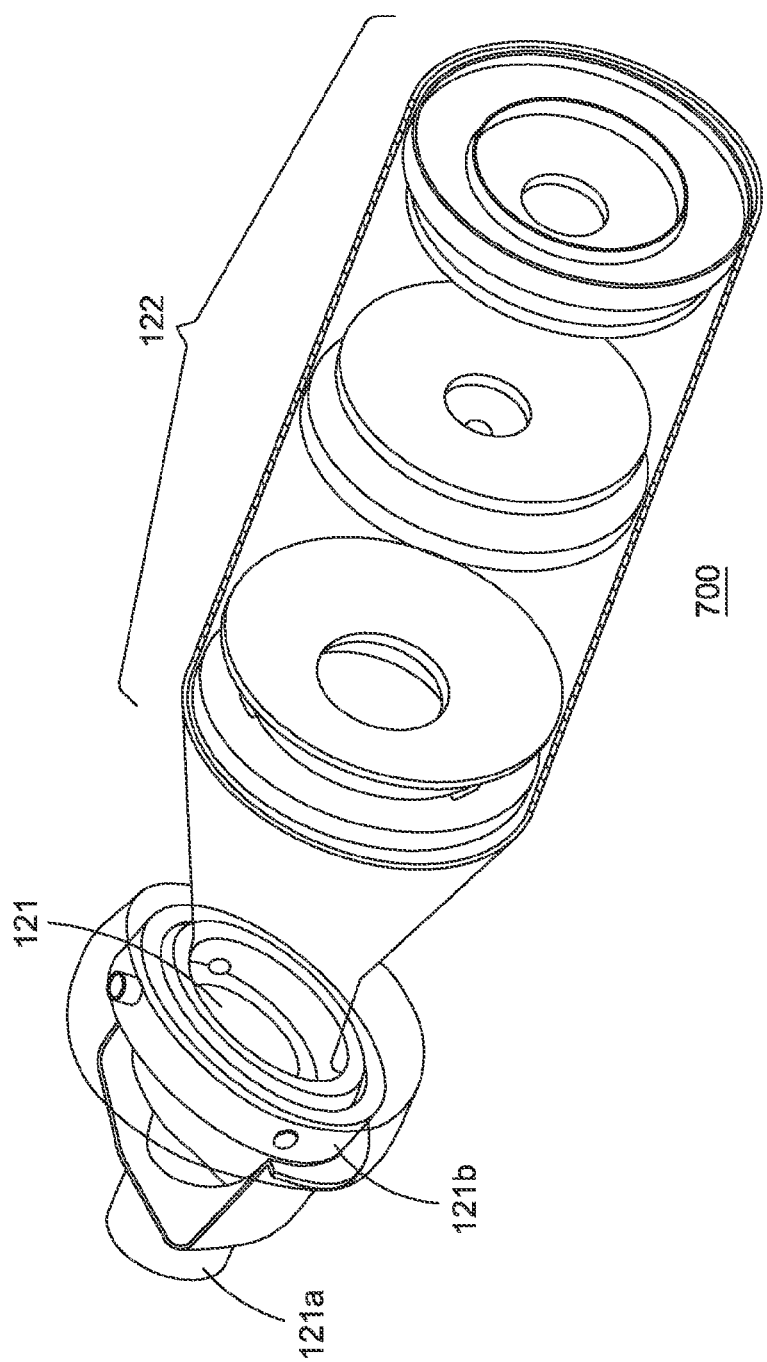
FIG. 7 illustrates an exemplary embodiment of the invention including a corrector module/assembly.
Figure 8:
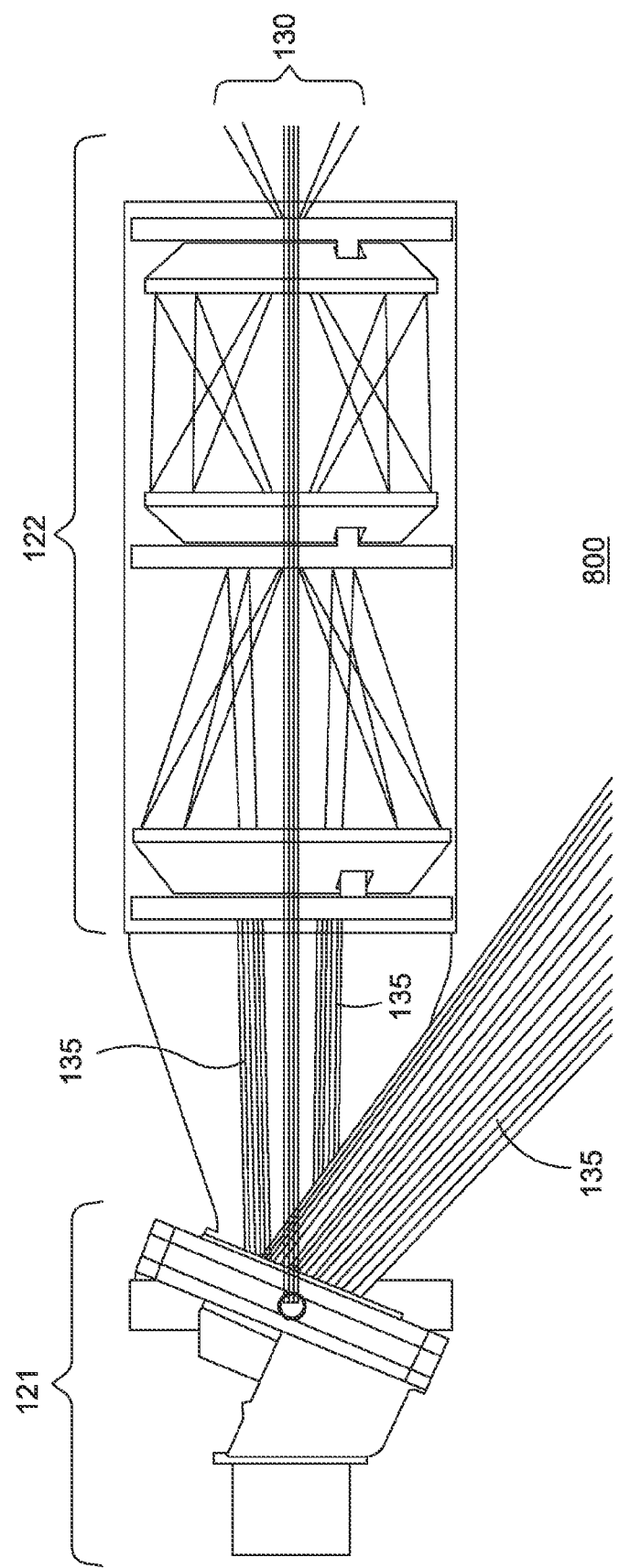
FIG. 8 illustrates an exemplary embodiment of the invention including a corrector module/assembly with optical paths.

FIGS. 7 and 8 illustrate aspects of an exemplary embodiment of the present invention including possible optical designs 700, 800 for corrector assembly 122, switching sensor actuator 121a, multi-axis pivot assembly 121b, and switching mirror 121. As shown in the figures, corrector assembly 122 comprises multiple optical components for processing the light beams 130 that have been reflected previously by primary reflecting mirror 110 in FIGS. 1, 2, 3, 4A, 4B, and/or 5. One skilled in the art would understand that the corrector assembly 122 may include components for processing the light beams 130 in various fashions and/or for different wavelengths.

Once the beams of light 130 have been processed by corrector assembly 122, they are then identified as processed beams of light 135, and they are transmitted to switching mirror 121. Switching mirror 121 is configured to transmit the processed beams of light 135 to various individual or multiple sensors, such as those sensors shown in FIG. 1 as residing in sensor module 150, and/or to the different optics processors 151, 152, 153, and 154 (respectively, for visible light, SWIR, MWIR, and LWIR light) shown in FIG. 6, for example. Switching mirror 121 may also perform a de-jitter function, for example, it may compensate for any jitter caused by movement throughout the scanning wide-field telescope. Switching mirror 121 is configured with multi-axis pivot assembly 121b that may include gimbles that tilt in a range of different planes and with multiple axis hinge points. Multi-axis pivot assembly 121b is configured to be controlled by switching sensor actuator 121a, that moves the multi-axis pivot assembly 121b to the location needed to properly transmit the processed beams of light 135 to an appropriate sensor or other receptor.

Figure 9:
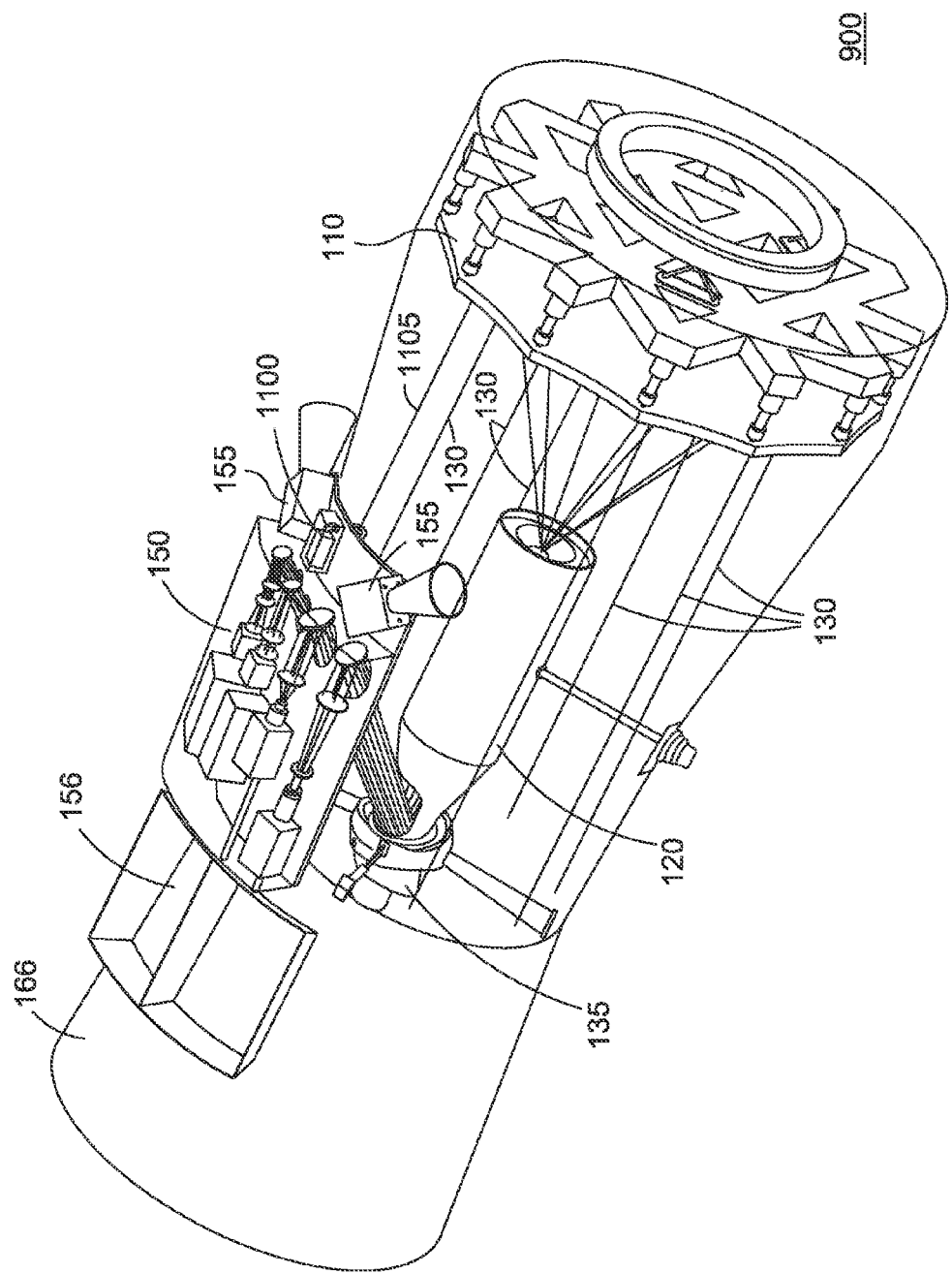
FIG. 9 illustrates an exemplary embodiment of the invention including a corrector module/assembly, a sensor module, and a general optical path from the primary reflective mirror, through the corrector module/assembly, and to the sensor module.

FIG. 9 is an illustration of an exemplary embodiment of the present invention including scanning wide-field telescope 900. As shown in the figure, beams of light 130 enter the hull 166 of scanning wide-field telescope 900 distally in reference to the primary reflecting mirror 110. Once the beams of light 130 reach primary reflecting mirror 110, they are reflected to the entry point of corrector assembly 120. The beams of light 130 may then be processed by corrector assembly 120 in any number of ways, including for spherical aberration. The processed beams of light 135 are then transmitted to sensor module 150 as individual wavelengths (such as visible light, SWIR, MWIR, and/or LWIR) and are further processed and/or analyzed. Information derived from sensor module 150 may then be transmitted to a base station, such as a satellite or an Earth-based unit.

Star tracker module 155 is a component used to track the stars to enable the scanning wide-field telescope 900 to correlate both its own location and its line of sight relative to known stars and objects.

Figure 10:
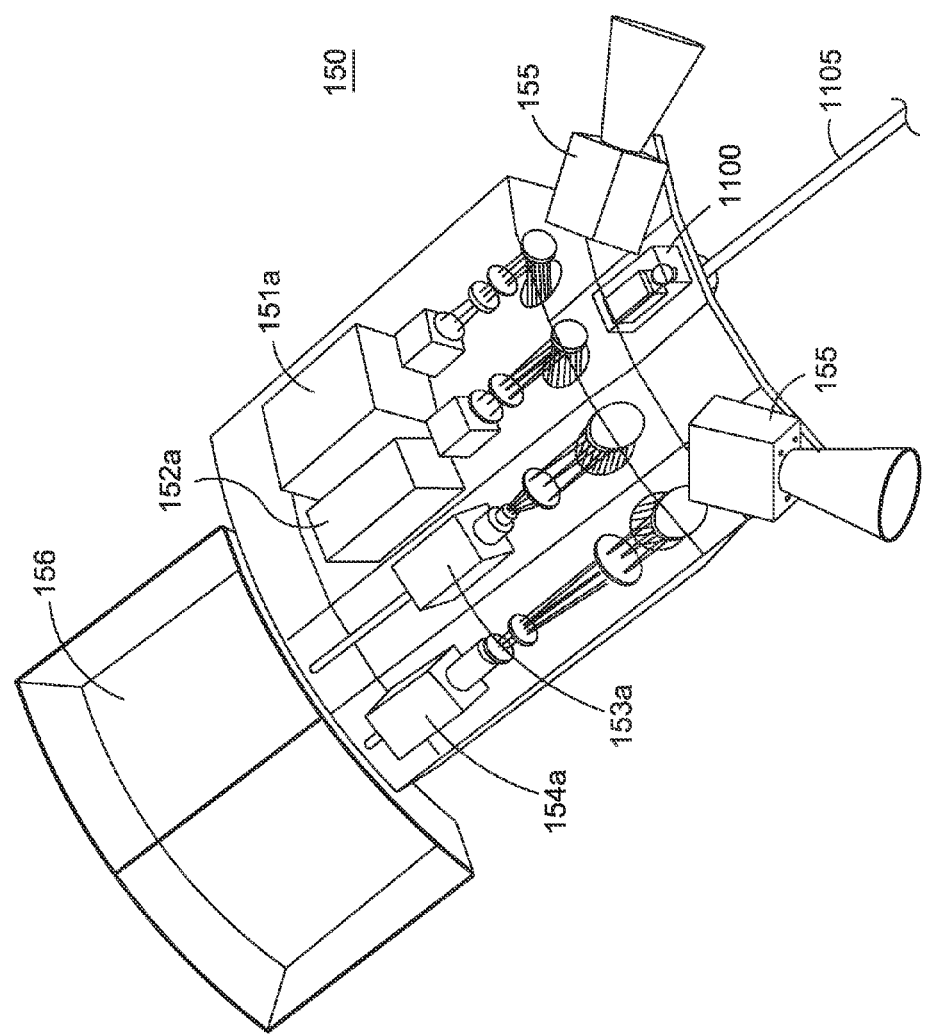
FIG. 10 illustrates an exemplary embodiment of the invention including a sensor module.

FIGS. 9 and 10 illustrate various aspects of an exemplary embodiment of the present invention including stable pointing and reference platform (SPRP) 1100, star tracker module 155, and optical sensor/analyzer units 151a, 152a, 153a, and 154a. SPRP 1100 projects a line of sight reference beam 1105 to the primary reflecting mirror 110. The line of sight reference beam 1105 may be based upon information taken from at least one of the star tracker 155, a laser gyro, and image pointing and stabilization electronics (not shown in the figure). Line of sight reference beam 1105 is provided to primary reflecting mirror 110, where it reflects to corrector assembly 120. As such, line of sight reference beam 1105 becomes a part of processed beams of light 135, and is returned to the sensor module 150. Because line of sight reference beam contains reference information, such as information derived from the star tracker 155, a laser gyro, and/or image pointing and stabilization electronics, the scanning wide-field telescope 900 is provided with the information needed to know where the scanning wide-field telescope 900 is located in reference to known objects, such as stars, planets, astronomical objects, and/or other spacecraft. The sensor module 150 may be in electrical communication with all moving and/or processing components within scanning wide-field telescope 900, such as corrector assembly 120, actuator arm(s) 140, force actuator(s) 112, and/or star tracker module 155. Sensor module 150 may be in electrical communication with solar cells, batteries, and/or radiator panels 156 for the purpose of powering the scanning wide-field telescope 900.

Figure 11:
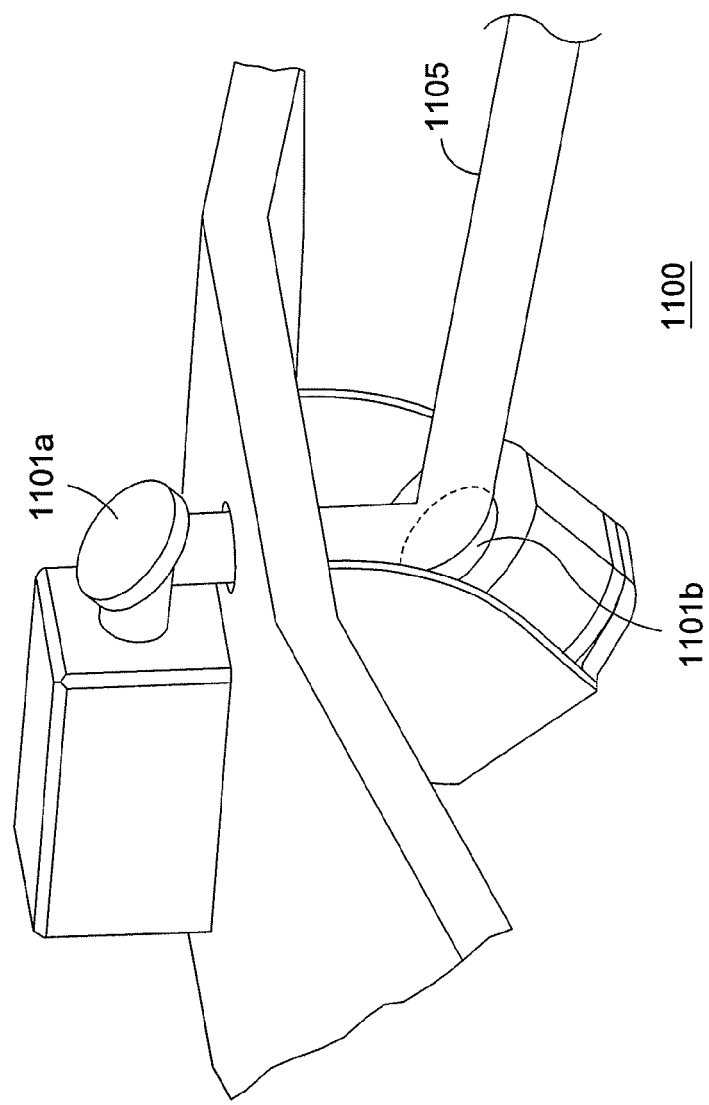
FIG. 11 illustrates an exemplary embodiment of the invention including a steering mirror module.

FIG. 11 is an illustration of aspects of an exemplary embodiment of the present invention including SPRP 1100. SPRP 1100 provides a line of sight reference beam 1105 to the primary reflecting mirror 110, as discussed above. The line of sight reference beam 1105 may be reflected by mirrors 1101a and 1101b to arrive at primary reflecting mirror 110.

Figure 12:
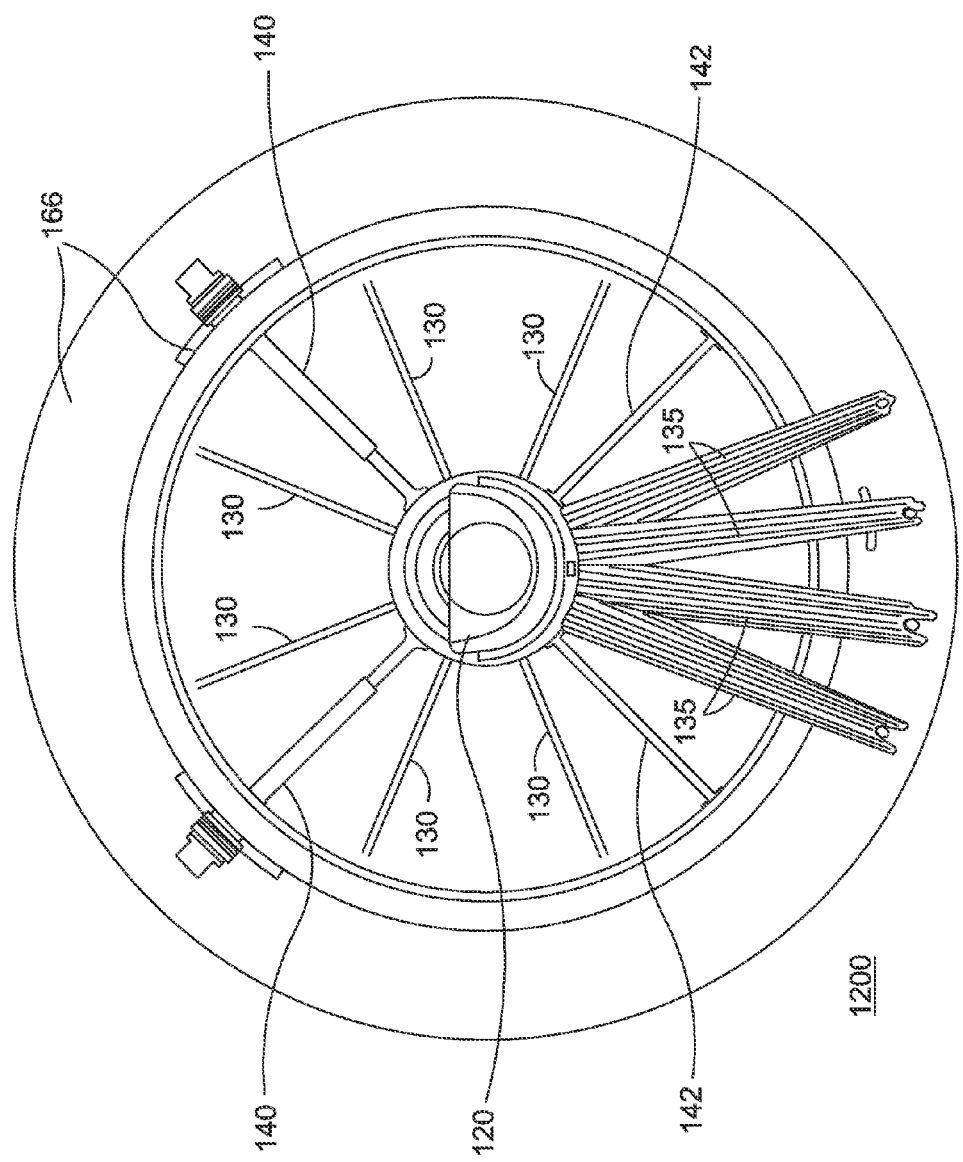
FIG. 12 illustrates an exemplary embodiment of the invention showing discrete sensor detection.

FIG. 12 is an illustration of aspects of an exemplary embodiment of the present invention. FIG. 12 is a cut-away view of hull 166 with various processed light beams 135 being provided to various optical processor and/or sensor/analyzer units, such as 151 and/or 151a, 152 and/or 152a, 153 and/or 153a, and/or 154 and/or 154a (as shown in FIGS. 6 and 10, respectively). As shown in FIG. 12, corrector assembly 120, through use of a switching mirror (not shown in the figure) provides the processed beams of light 135 to various points within scanning wide-field telescope 1200, allowing various processed light beams 135 to be further processed and/or analyzed specific to their purpose and according to their characteristics. For example, visible light may be provided to a charged coupled device such as a digital camera, and then a digitized picture of an object of interest may be transmitted from the scanning wide-field telescope using various transmission/reception means or methods to a base station, such as a satellite or an Earth-based unit.

As shown in FIG. 12, actuator arms 140 are separated by approximately a 90 degree difference. When each or individual ones of the actuator arms 140 extend or retract, corrector assembly 120 moves. Because there are two actuator arms 140, corrector assembly 120 is thereby configured to move in a trajectory. The trajectory may be a radial trajectory to any desired pointing angle to image on object of interest within the field of regard. Corrector assembly 120 is pivotally fixed to hull body/frame 166 by struts 142. Struts 142 may be joined to corrector assembly 120 with a gimble or gimbles, a pivot joint, a u-joint, a ball and socket, or the like. Struts 142 are located distally to primary reflecting mirror 110 (not shown in the figure), while actuator arms 140 are located in a more central region of a lengthwise section of corrector assembly 120. Due to the configuration of the struts 142 and the movement of actuator arms 140, the corrector assembly 120 is configured to scan a large optical field of regard in relation to multiple focal planes of light reflected by primary reflecting mirror 110 from any number of objects of interest within the field of regard, without slewing the scanning wide-field telescope 1200.

Figure 13:
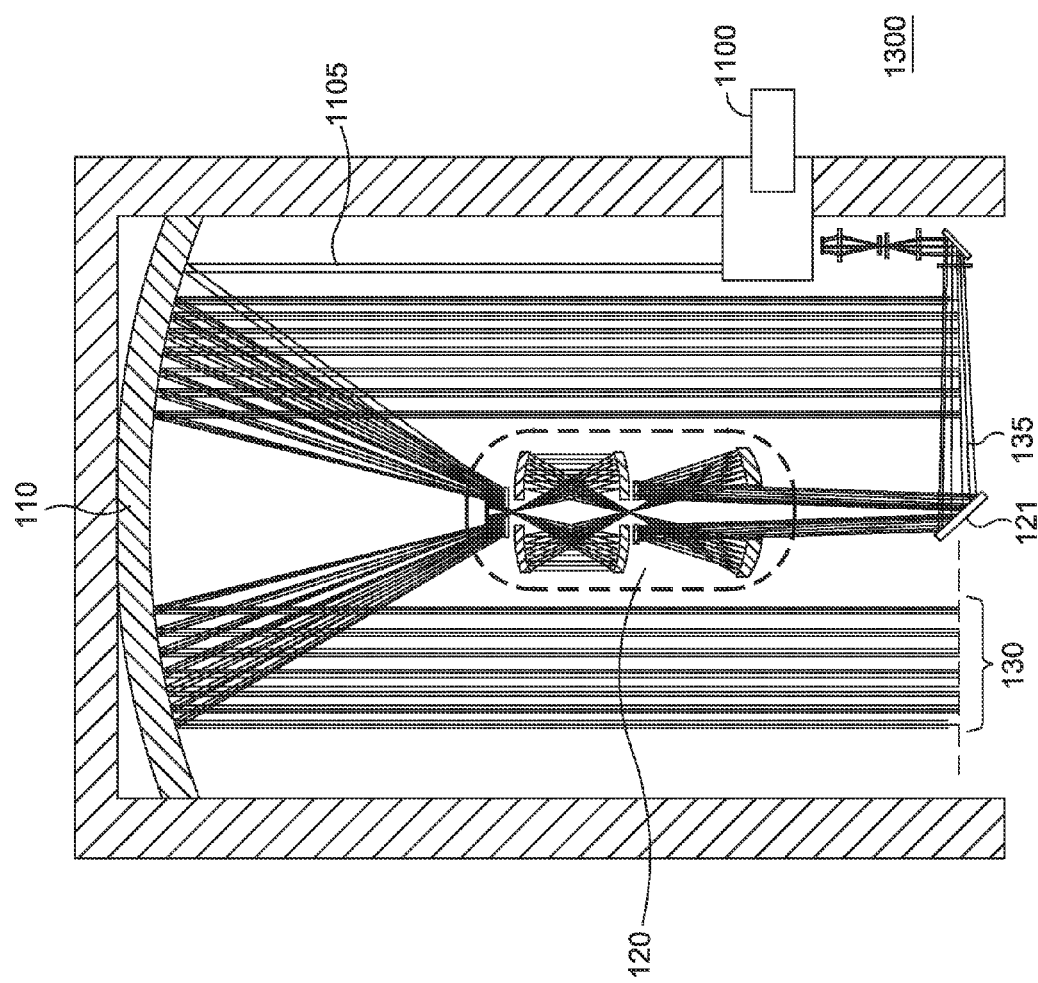
FIG. 13 illustrates an exemplary embodiment of the invention including an active pointing control module.

FIG. 13 is an illustration of aspects of an exemplary embodiment of the present invention including SPRP 1100. In addition to providing line of sight reference beam 1105 to primary reflecting mirror 110, SPRP 1100 may include a star tracker 155 to allow the scanning wide-field telescope 1300 to posses very high precision pointing knowledge. That is, the star tracker may be provided with advance knowledge of where various stars and/or constellations are located in reference to each other, and from that knowledge determine where the scanning wide-field telescope 1300 is located and where it is pointing.

Figure 14:
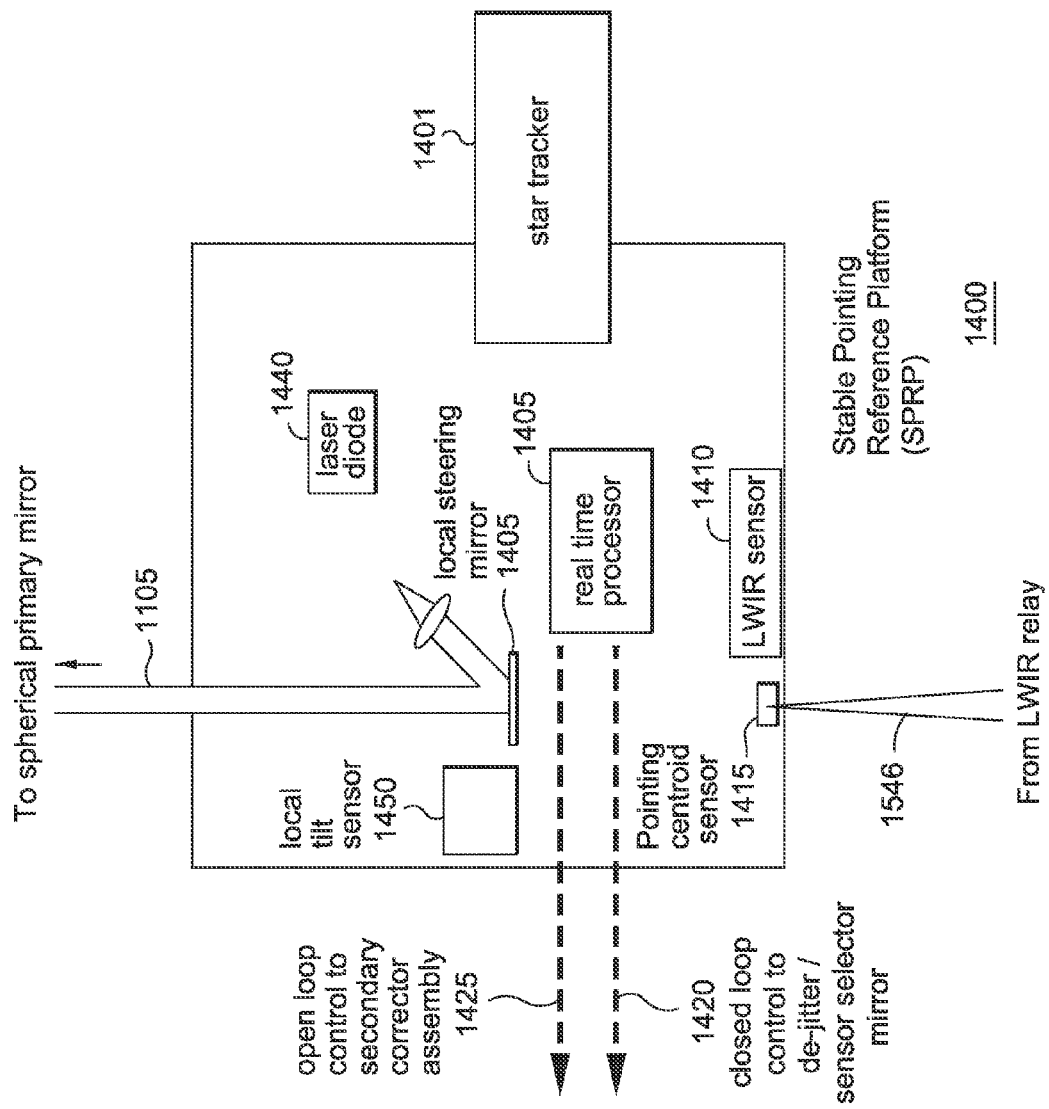
FIG. 14 illustrates an exemplary embodiment of the invention including a stable pointing reference platform (SPRP) module.

FIG. 14 is a schematic representation of aspects of an exemplary embodiment of the present invention including stable pointing reference platform (SPRP) 1400. The schematic shown in FIG. 14 may be used to describe either SPRP 1100 or SPRP 1400. As shown in the figure, SPRP 1400 comprises star tracker 1401, processor unit 1405, long-wave infrared sensor 1410, pointing centroid sensor 1415, closed loop control for de-jitter/sensor switching mirror 1420, open loop control for secondary corrector assembly 1425, tilt sensor 1430, laser diode 1440, local steering mirror 1435, long-wave infrared beam 1546, and line of sight reference beam 1105. Processor unit 1405 may be configured with either internal or external memory. Processor unit 1405 may include a bus or other communication mechanism for communicating information and/or instructions to and from any of the moving portions and/or electronics sections of scanning wide-field telescope 100/200/300/900/1200. For instance, processor unit 1405 may receive information from sensor module 150 and/or may instruct sensor module 150 to transmit information using various transmission methods or means to a base station (such as on Earth), or processor unit 1405 may instruct actuator arm 140 to extend to move corrector assembly 120 to various focal planes, such as a focal plane corresponding to either of objects of interest 165/175 (shown in FIGS. 2 and 3). Processing unit 1405 may have access to a memory that stores the locations of known planetary objects, and based on the input of long-wave infrared input signal 1546 in view of the known planetary objects, processing unit 1405 may provide specific information for pointing and location of the scanning wide-field telescope 100/200/300/900/1200. Star tracker 1401 provides tracking information to processing unit 1405 for tracking various stars and for determining where to point the telescope and its location relative to various stars.

Pointing knowledge may be further enhanced with tilt sensor 1430, which may be a sub-microradian tilt sensor for providing tilt information to processor unit 1435. Laser diode 1440 is used for generating the line of sight reference beam 1105 that is directed at primary reflecting mirror 110 by local steering mirror 1435. Local steering mirror 1435 receives direction on where to aim line of sight reference beam 1105 from processor unit 1405 based on inputs from at least one of tilt sensor 1430, star tracker 1401, pointing centroid sensor 1415 such as a Position Sensitive Director (PSD) as is known in the art, and/or long-wave infrared sensor 1410, as one of skill in the art would comprehend. Processor unit 1405 generates two control signals that each go to corrector assembly 120: an open loop control signal to corrector assembly 122, and a closed loop control signal to switching sensor actuator 121a. The open loop control signal to corrector assembly 122 allows for movement of mirrors and optics so that correct processing is performed on the beams of light 130. The closed loop control signal instructs switching sensor actuator 121a to de-jitter the processed beams of light 135 and/or to transmit the processed beams of light with the switching mirror 121 to various optical processor and/or sensor/analyzer units, such as 151 and/or 151a, 152 and/or 152a, 153 and/or 153a, and/or 154 and/or 154a (as shown in FIGS. 6 and 10, respectively).

Figure 15:
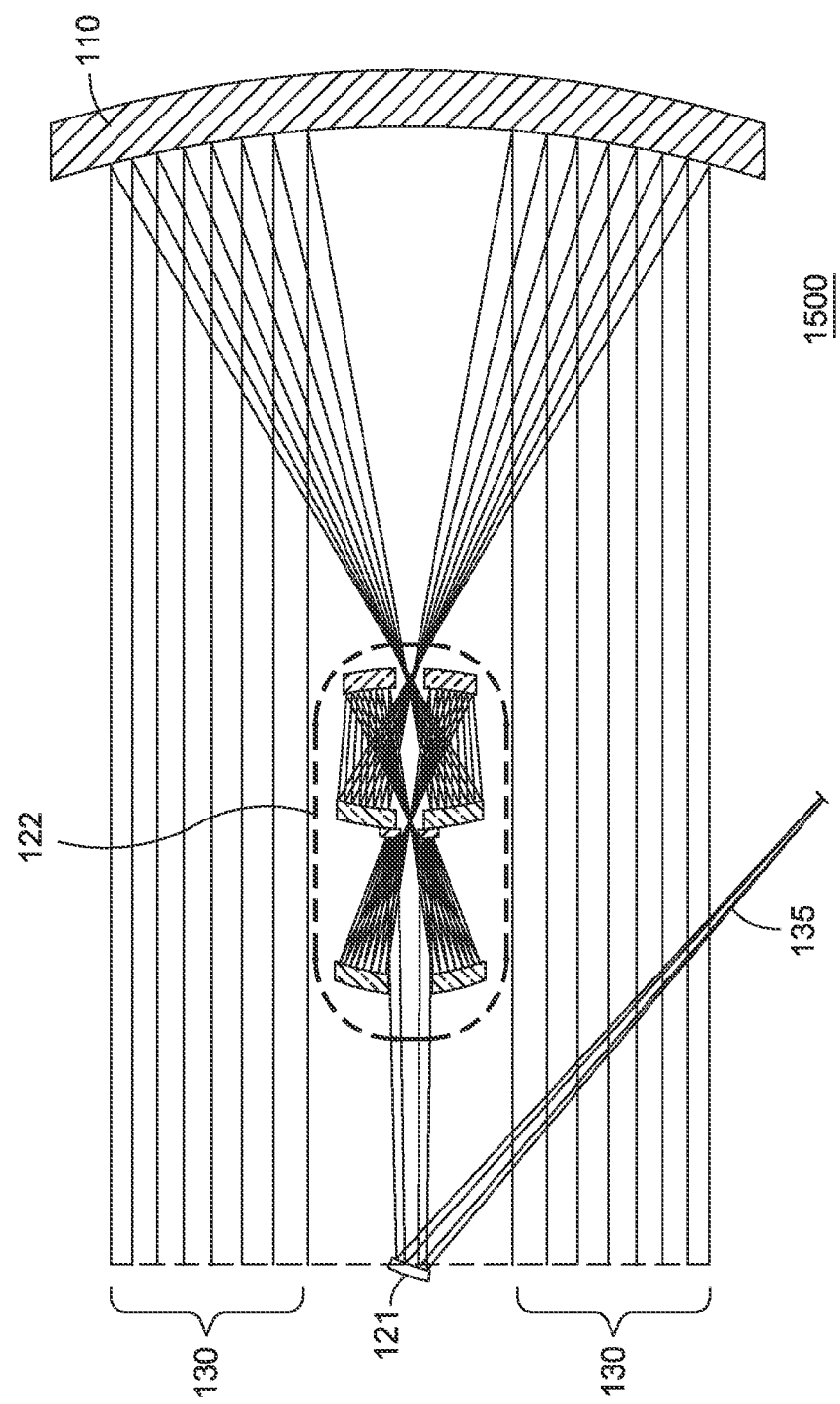
FIG. 15 illustrates an exemplary embodiment of the invention including a view of the primary reflective mirror, corrector assembly, and a de-jitter mirror.

FIG. 15 illustrates an aspect of an exemplary embodiment of the present invention that is similar in nature to that shown in FIG. 13. For the sake of brevity and ease of understanding, like components will not be re-discussed. FIG. 15 is another embodiment showing that the light beams may be folded in any number of fashions at the output of the telescope device 1500.

Figure 16:
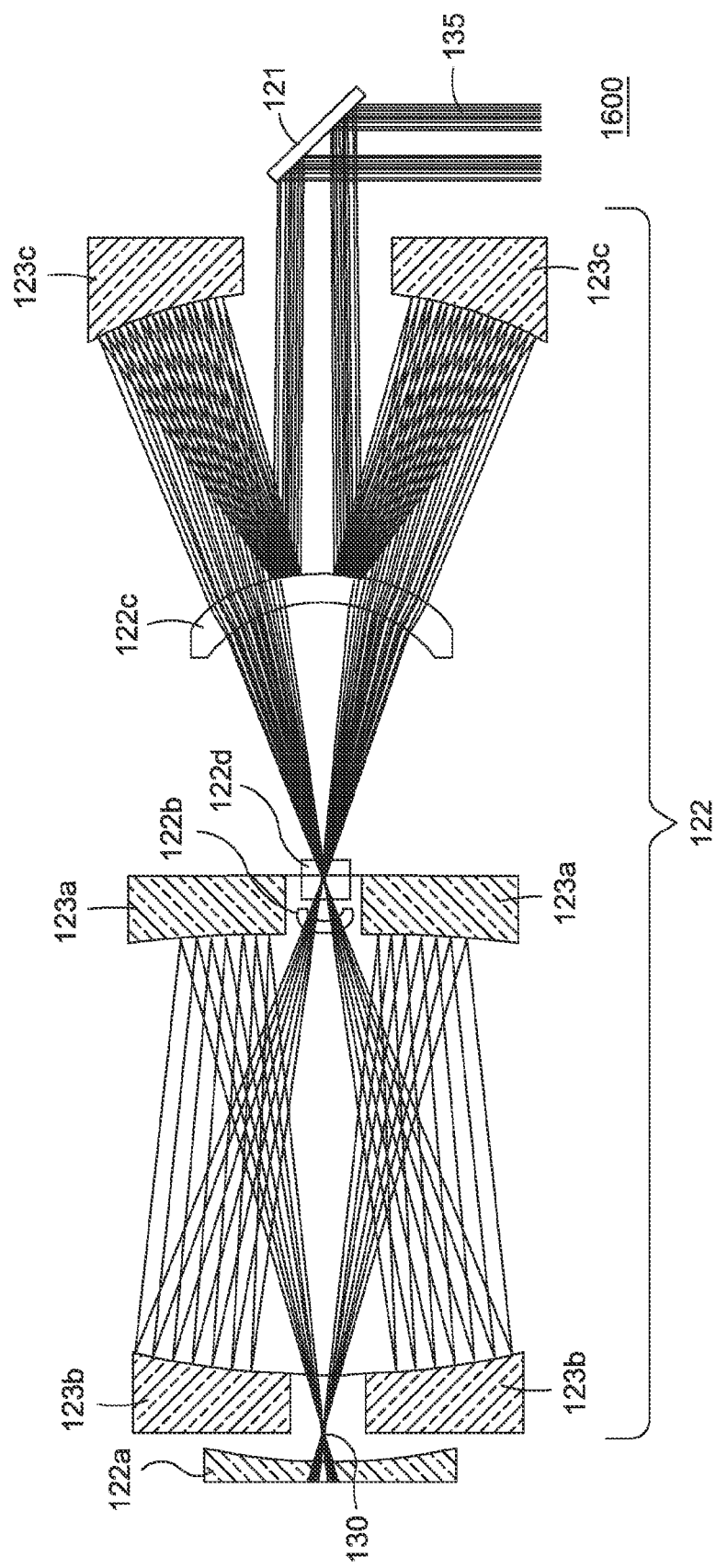
FIG. 16 illustrates an exemplary embodiment of the invention including a corrector module/assembly with four lenses and three powered mirrors.

FIG. 16 illustrates aspects of an exemplary embodiment of the present invention including possible optical design 1600 for corrector assembly 122 including mirrors 123a, 123b, and 123c, and lenses 122a, 122b, and 122c. Also shown is switching mirror 121, beams of light 130, and processed beams of light 135. Corrector assembly 122 comprises multiple optical components for processing the light beams 130 that have been reflected previously by a primary reflective mirror, such as primary reflecting mirror 110 in FIGS. 1, 2, 3, 4A, 4B, and/or 5. Because the face of primary reflecting mirror 110 is spherical, the beams of light 130 may include spherical aberration. Spherical aberration may include the phenomenon of a center portion of a focal plane having a different focus that an outer portion of a focal plane. The spherical aberration may be corrected by corrector assembly 120 using components that are a reverse-match to the spherical imprint left on the light beams 130 by primary reflective mirror 110, as one of skill in the art would comprehend.

As described above, it is possible to implement some aspects of the present invention as a method and/or in a computer system. The computer system may include a bus or other communication mechanism for communicating information, and a processor coupled with the bus for processing information. The computer system may also include a memory coupled to the bus for storing information and instructions to be executed by the processor. The memory may also be used for storing temporary variables or other intermediate information during execution of instructions by the processor. The computer system further may also include a data storage device, such as a magnetic disk or optical disk, coupled to the bus for storing information and instructions. The computer system may be coupled to a display device for displaying information to a user. An input device, such as, for example, a keyboard or a mouse may also be coupled to the computer system for communicating information and command selections to the processor.

According to some embodiments of the present invention, selective adjustment of the position of the corrector assembly may be performed utilizing software, an algorithm, a processor, and/or a computer system in response to an output of a processor executing one or more sequences of one or more instructions contained in a memory. Such instructions may be read into the memory from a machine-readable medium, such as a data storage device.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

It is understood that the specific order or hierarchy or steps in the processes disclosed herein is an illustration of exemplary approaches. Based upon design preferences, it is understood that the specific order or hierarchy of steps in the process may be re-arranged. Some of the steps may be performed simultaneously. The accompanying method claims present elements of the various in a sample order and are not meant to be limited to the specific order or hierarchy presented.

A reference to an element in the singular is not intended to mean "one and only one" unless specifically stated, but rather "one or more." The term "information" may include data (e.g., audio, video, multimedia, instructions, commands, or other information). The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A scanning wide-field telescope comprising:
a primary reflecting mirror and a corrector assembly,
wherein the corrector assembly is configured between the primary reflecting mirror and a viewing end of the telescope, and is configured to move within a first trajectory,
wherein the first trajectory comprises movement from an axis that is substantially parallel to a center line of sight of the scanning wide-field telescope to an axis that is substantially parallel to a peripheral line of sight of the scanning wide-field telescope, and
wherein the center line of sight and the peripheral line of sight are not parallel.

2. The scanning wide-field telescope of claim 1, further comprising a selector mirror located at an output of the corrector assembly.

3. The scanning wide-field telescope of claim 2, wherein the selector mirror is configured to control jitter.

4. The scanning wide-field telescope of claim 1, wherein the primary reflecting mirror is a spherical mirror.

5. The scanning wide-field telescope of claim 1, wherein the corrector assembly is configured to process multiple optical bands.

6. The scanning wide-field telescope of claim 5, wherein the multiple optical bands comprises at least visible light and infrared light.

7. The scanning wide-field telescope of claim 6, further comprising a switching mirror configured to switch between individual ones of the multiple optical bands.

8. The scanning wide-field telescope of claim 1, wherein the corrector assembly is configured to correct for spherical aberration.

9. The scanning wide-field telescope of claim 1, further comprising a steering mirror configured to provide a steering light beam to the primary reflecting mirror.

10. A method for a scanning wide-field telescope, the scanning wide-field telescope including a primary reflecting mirror and a corrector assembly, wherein the corrector assembly is configured between the primary reflecting mirror and a viewing end of the telescope, the method comprising:
receiving light from an object to be viewed at the primary reflecting mirror;
reflecting the light from the primary reflecting mirror;
moving the corrector assembly in a first trajectory to a focal point of the reflected light; and
moving from an axis that is substantially parallel to a center line of sight of the scanning wide-field telescope to an axis that is substantially parallel to a peripheral line of sight of the scanning wide-field telescope,
wherein the center line of sight and the peripheral line of sight are not parallel.

11. The method of claim 10, further comprising correcting for jitter with a de-jitter mirror.

12. The method of claim 11, wherein the corrector is configured to move to any of multiple optical focal points of the primary reflecting mirror.

13. The method of claim 10, further comprising processing multiple optical bands with the corrector assembly.

14. The method of claim 13, wherein the multiple optical bands comprises at least visible light and infrared light.

15. The method of claim 13, further comprising switching between individual ones of the multiple optical hands with a switching mirror.

16. The method of claim 10, further comprising correcting for spherical aberration with the corrector assembly.

* * * * *